Sept. 5, 1933.  T. LICHTENBERGER  1,925,490
COAL AND WATER GAS PROCESS
Filed April 5, 1929
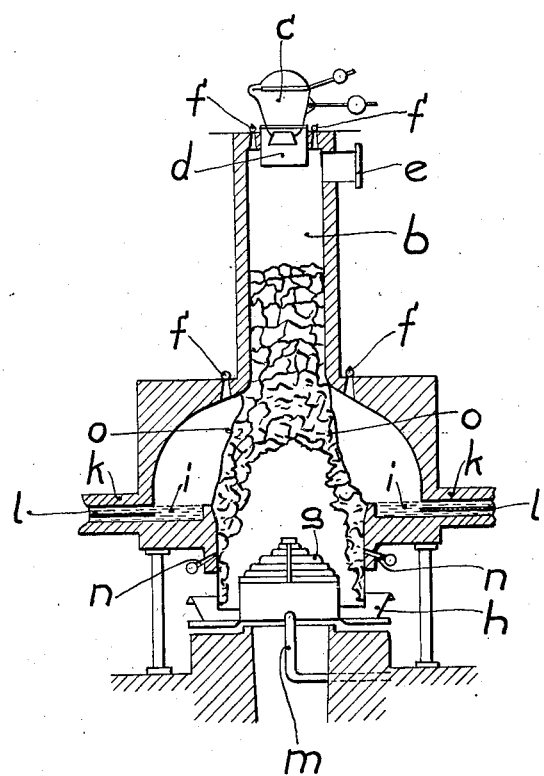
Inventor:
Theodor Lichtenberger
By
Attorney Patented Sept. 5, 1933

1,925,490

UNITED STATES PATENT OFFICE 1,925,490

COAL AND WATER GAS PROCESS

Theodor Lichtenberger, Stuttgart, Germany

Application April 5, 1929, Serial No. 352,878, and in Germany April 7, 1928

1 Claim. (Cl. 48—202)

This invention relates to an improved method and apparatus for the distilling of gas from and for the gasification of unground fuel. The invention consists in distilling and gasifying any unground fuel in a generator without supply of air by the radiating heat of a bath of molten salt.

It has previously been proposed to direct a stream of steam mixed with coal dust over a bath of slag.

With the present invention any generator without air supply is used, in which any unground coal can be employed. This generator has for instance an annular tub, in which circulates a molten bath of salt, heated outside the gas generator. By passing through the generator the fuel takes up radiating heat of the salt fusion, so that a complete extraction and gasification of the fuel is obtained.

This process offers the advantage that with absolute constancy a highly valuable gas, not injured by the addition of air is produced. Moreover the improved method offers the advantage of security of working in as much as in the case of being chilled the molten salt can be di-solved by water without destroying the gas generator.

Furthermore the use of the molten salt according to the invention in consequence of the constancy of the melting point, and in consequence of its great heat of fusion offers special advantages for the working process in as much as it is possible to use up all the fuel without any residues or waste. The possibility of working without any air supply facilitates an exceedingly compact arrangement of the spaces for distilling and gasifying combined with the heating space, of which results an immensely high concentration of heat.

The delivered heat is continually replaced by the circulation of the heating medium. The fuel to be used for producing gas is poured in loosely to form a high layer and will thereby be highly heated by the radiating heat of the smelting bath. The steam used for the gasification and the produced watergas, support the translation of heat to the fuel as they are good heat-conductors.

In the accompanying drawing one embodiment of the invention is shown in a vertical sectional view through a gas generator.

The generator $a$ is provided with a heating chamber $b$ provided with a double closure $c\ d$ and stirring holes $f$.

The outlet gas pipe is marked $e$. The generator has an ordinary rotary grate $g$ which however is closed at the bottom, so that no fresh air can penetrate through the rotary grate. Below said grate steam is supplied by a pipe $m$ and also round about the circumference steampipes, connected to an annular steam-conductor $p$ may be added. The lower part of the generator is in a water seal pan $h$ for carrying out the ashes. The present generator differs from the known kind only in that any supply of air is strictly avoided. About in half the height of the generator a broad annular space $i$ is connected by two pipes $k\ k$ with the molten bath of the heating-medium. Advantageously the molten salt enters through one of the pipes $k$, while it passes off through the other pipe $k$. Provision also may be made to carry out the passing in and off through one single pipe provided with a partition wall $l$. The annular space $i$ takes up the molten salt and transfers by radiation the whole heat in the concave space above it, wherefrom the heat is reflected to the pile of fuel $o\ o$.

The inevitable slag is carried away, as is well known, through the water seal pan $h$. This carrying away of ashes is most important, as according to the present process, especially fuel of very little value such as browncoal, lignite, oil shale which have very high contents of ashes and which hitherto could not be subjected to a rational treatment and use now can be used for the production of a highly valuable gas. As to the temperature, the molten salt, especially if sodium chloride is used is introduced to the generator at 900–1000° C., and passes off at about 800° C. As the capacity of heat is very great, large quantities of heat in this way can be transferred. It is not advisable to use more than 1000° C., as in the use of sodium chloride an evaporation and a loss of the molten salt would occur. Instead of sodium chloride also chloride of barium or other molten salts can be used.

It is, of course, well known that coal such as bituminous coal when heated will more or less adhere together as is evident in the manufacture of coke. Therefore, it will be apparent that the column of fuel $o$ will be self-supporting in the generator $a$.

I claim:

A process for distilling coal and gasifying coke by injecting steam into the fuel in a single operation, which consists in exposing the fuel in the form of a descending column in a water-gas generator to the radiating heat of a molten salt bath which is soluble in water.

THEODOR LICHTENBERGER.